US008017001B2

(12) United States Patent
Morgan

(10) Patent No.: US 8,017,001 B2
(45) Date of Patent: Sep. 13, 2011

(54) SYSTEM FOR MINERAL HARDNESS MANAGEMENT

(75) Inventor: David Morgan, Scottsdale, AZ (US)

(73) Assignee: Rayne Dealership Corporation, San Diego, CA (US)

( * ) Notice: Subject to any disclaimer, the term of this patent is extended or adjusted under 35 U.S.C. 154(b) by 713 days.

(21) Appl. No.: 11/778,265

(22) Filed: Jul. 16, 2007

(65) Prior Publication Data
US 2008/0067131 A1    Mar. 20, 2008

Related U.S. Application Data

(60) Provisional application No. 60/807,369, filed on Jul. 14, 2006.

(51) Int. Cl.
C02F 1/58    (2006.01)
C02F 5/02    (2006.01)
C02F 103/42    (2006.01)

(52) U.S. Cl. ............. 210/96.1; 210/167.11; 210/167.12; 210/196; 210/199; 210/206; 210/241; 210/258

(58) Field of Classification Search ............. 210/167.11
See application file for complete search history.

(56) References Cited

U.S. PATENT DOCUMENTS

| | | | | |
|---|---|---|---|---|
| 3,202,322 A * | 8/1965 | Cleary et al. | ............... | 222/173 |
| 3,214,369 A * | 10/1965 | Felix | ............... | 210/667 |
| 3,650,405 A * | 3/1972 | Morrison | ............... | 210/241 |
| 3,666,663 A * | 5/1972 | Walker | ............... | 210/738 |
| 3,833,122 A * | 9/1974 | Cook | ............... | 210/207 |
| 4,105,560 A * | 8/1978 | Fismer | ............... | 210/230 |
| 4,773,996 A * | 9/1988 | Endo et al. | ............... | 210/225 |
| 5,021,156 A * | 6/1991 | Sloan | ............... | 210/241 |
| 5,716,519 A * | 2/1998 | Schleife et al. | ............... | 210/206 |
| 5,833,841 A * | 11/1998 | Koslowsky | ............... | 210/96.1 |
| 6,039,886 A * | 3/2000 | Henkin et al. | ............... | 210/776 |
| 6,852,218 B2 * | 2/2005 | Vila Corts | ............... | 210/167.11 |
| 7,537,691 B2 * | 5/2009 | Reid | ............... | 210/167.12 |
| 7,736,497 B2 * | 6/2010 | Fout et al. | ............... | 210/143 |
| 7,901,571 B2 * | 3/2011 | Woods et al. | ............... | 210/96.1 |

OTHER PUBLICATIONS

Walker, Harold, "Water Resources Research Grant Proposal: Enhanced Removal of DBP Precursors During Precipitative Softening Through Co-Adsorption Process", Ohio State University, Columbus, OH, 2000.
Schutte & Koerting, "Liquid Handling Dry Solids Eductors", Bensalem, PA, 2007.
American Water Works Association Staff, "Basic Science Concepts and Applications", Third Edition published 2003, p. 430-485.
Beard, Betty, "Tempe co. cleans pools, no drainage", The Arizona Republic, Jul. 13, 2007.
Mustafa, Bob, "Lime-Soda Softening Process Modifications for Enhanced NOM Removal", Journal of Environmental Engineering, vol. 132, No. 2, Feb. 2006 pp. 158-165.

(Continued)

Primary Examiner — Peter A Hruskoci
(74) Attorney, Agent, or Firm — Janah & Associates, P.C.

(57) ABSTRACT

The disclosed systems and methods for maintenance of an enclosed body of water generally include mobile systems and/or methods for removal of mineral hardness and other particulate impurities via lime softening filtration. Chemicals are added to a body of water containing unwanted mineral hardness (or other particulate impurities) and mixed to assist dispersion. The chemicals react with the hardness minerals making them insoluble. The resulting precipitate falls out of solution to the bottom of the body of water for subsequent removal via filtration. This eliminates or otherwise reduces the need for draining water and/or adding new water to a body of water to maintain proper mineral hardness balance and/or concentration of other particulate impurities.

48 Claims, 13 Drawing Sheets

OTHER PUBLICATIONS

Jones, Christopher, "Reduced Lime Feeds: Effects on Operational Costs and Water Quality", Des Moines Water Works, Des Moines. Iowa, 2005.

Francis, Harry, "Chemical Treatment of Water Using Lime", e-lime cement gypsum, 2006.

* cited by examiner

SYSTEM FOR MINERAL HARDNESS MANAGEMENT

RELATED APPLICATIONS

This application claims priority to U.S. Provisional Patent Application Ser. No. 60/807,369 filed in the United States Patent and Trademark Office on Jul. 14, 2006 by David Morgan.

FIELD OF INVENTION

The present invention generally concerns the chemical and mechanical removal of impurities from enclosed bodies of water; and more particularly, representative and exemplary embodiments of the present invention generally relate to improved methods and systems for removal of minerals, lipids, and other impurities from swimming pools utilizing a mobile lime softening filtration system.

BACKGROUND OF THE INVENTION

Society's fascination with enclosed bodies of water reaches back to ancient times. As early as the 3rd millennium, B.C., a "great bath" was constructed and was perhaps the world's first swimming pool. Artificial swimming pools, ponds and fountains were popular in the ancient West and East alike, from Greeks, Romans, to Ancient Sinhalese. In fact, Roman emperors had private swimming pools in which fish also were kept, hence the Latin word for pool, "piscina". In Ancient Sinhalese times, pools were decorated with flights of steps as well as "punkalas", or pots of abundance, and scroll designs.

The fascination with man-made bodies of water remains strong today. For example, in some parts of the world, a swimming pool for private use is generally considered a status symbol (an indoor private pool, even more so). The private use of fountains, ponds and the like may also provide some correlation to status; however, these bodies of water are often generally incorporated in gardens and landscaping. Fountains, ponds, and/or reflecting pools associated with various government or historic places often become attractions in their own right. The reflecting pool in Washington, D.C., Trevi Fountain in Rome, and King Fahd's Fountain in Saudi Arabia are just a few of many famous examples.

Maintaining enclosed bodies of water, particularly those in areas where the water supply is mineral rich (i.e., "hard"), or bodies of water with frequent human contact can be difficult. As for bodies of water containing "hard" water, minerals and/or mineral deposits may accumulate on the sides of the enclosure for the water over time. As these minerals accumulate, both mechanical and aesthetic problems generally occur. Conventional mechanisms for removing unwanted mineral deposits in water body enclosures may prove to be both difficult and expensive. These mechanisms include sand blasting and scrubbing with pumice stones. Most conventional techniques require partial, if not complete drainage of the body of water. Particularly in areas of the country where water scarcity and drought conditions exist, this can be an expensive, environmentally unfriendly, or legally restrictive task.

Swimming pools are bodies of water that often have high levels of human use. It is therefore imperative that swimming pool water be maintained with very low levels of bacteria and viruses in order to prevent the spread of diseases and pathogens among users. Strong oxidizing agents are often used, especially simple chlorine compounds such as sodium hypochlorite. Other disinfectants include bromine compounds and ozone generated on site by passing an electrical discharge through oxygen or air. Chlorine may be supplied in the form of sodium hypochlorite solution, powdered calcium hypochlorite ("cal hypo"), cyanurated chlorine compounds (so called "stabilized" chlorine), or by dissolving chlorine gas directly in water. Maintaining a safe concentration of disinfectant is important for assuring the safety and health of swimming pool users. When any of these pool chemicals are used, it is important to keep the pH of the pool in the range of about 7.2 to 7.6. Higher pH dramatically reduces the sanitizing power of the chlorine due to decreased oxidation reduction potential, while lower pH causes user discomfort, especially to the eyes.

Where the water is sanitized by means of oxidizers, some suppliers of electronic monitoring equipment recommend that the efficacy of the oxidizer be measured by the oxidation-reduction potential of the water—a factor measured in millivolts, where the minimum acceptable oxidation reduction potential level in public pools is 650 millivolts. This is intended to ensure a 1-second kill rate for microorganisms introduced into the water. Unfortunately, a commonly used non-chlorine supplemental oxidizer, potassium monopersulfate, can produce measured 650 mV levels even in the absence of all sanitizing residuals. Cyanurated ("stabilized") chlorinators can give falsely high chlorine readings when tested with OTO (ortho-tolidene, a yellow indicator dye used in inexpensive test kits), since the chlorine indicated by the dye is mostly in a combined form instead of free, and does not contribute to oxidation reduction potential. Oxidation reduction potential test cells are available as handheld instruments, and as probes for mounting permanently in the pool circulation plumbing to control automatic chlorine feeders.

Test kits to make basic measurements of free chlorine and pH from a sample of pool water, which are the most important items to control in a swimming pool, are packaged with small dropper bottles of reagents. These reagents are typically OTO for chlorine and phenol red for pH. The kits include vials for mixing a water sample with the test reagents, and color charts for reading the indicated levels. Besides chlorine and pH, which should be checked frequently, more sophisticated reagent kits provide tests for acid demand and base demand, total alkalinity (TA), calcium hardness, and cyanurate ("stabilizer") concentration. These additional tests tend to vary only over weeks or months in a well-maintained pool, and thus need not be checked as frequently as chlorine and pH.

Pool sanitation, which necessarily involves toxic or mechanical means of killing microbes, can sometimes unintentionally irritate the users, especially if poorly maintained, such as when a high level of chlorine and/or low pH exists. Non-chlorine sanitizing chemicals and devices are promoted as being less harsh, but any sanitizer may have harsh unintended consequences if overused.

Water circulating through a pipe may be sterilized with UV light instead of chemicals, but some level of chemical sanitizer is still needed, because only a small portion of the pool water passes through the circulation system at any given time, and the circulation system typically only runs for a few hours each day. UV sterilization also does not inhibit algae from growing on pool surfaces, and it does not break down dissolved nitrogenous nutrients that feed algae growth. Accordingly, some type of oxidizing sanitizer is still generally needed to check these trends, although it need not be dosed during bathing hours for this purpose.

Generally, a well-managed pool will have no smell or taste, be scrupulously clean, and have crystal clear water. Most people would not want to swim in a pool that appears dirty even if germs were under control. A pool pump circulates water through a strainer and filter to remove dirt and other suspended particles. The plumbing circuit may also include a gas or electric heater, solar panels, and chemical injectors.

The proper management of a backyard swimming pool may be a difficult and time-consuming task. The chemical balance of the water has to be carefully monitored to make sure that it does not become fouled with algae or bacteria. Either of these will make the water smell and look unpleasant and can be a serious health hazard. The water must also be kept clear of debris such as fallen leaves and sticks, as these encourage fouling and become very slippery and dangerous as they start to decompose. Most people keep their pool either covered over or drained entirely during the months of the year in which it is not in use, as this is the easiest way to keep it sanitary (draining however can be a serious safety hazard with deeper pools and re-filling can be expensive in areas where water is scarce). Public and competitive swimming pools are therefore often, especially in colder climates, indoor pools— covered with a roof and heated—to enable their use all year round.

Chlorine may be generated on site, such as in saltwater pools. This type of system generates chlorine by electrolysis of dissolved salt (NaCl) using an electrical cell in the pool plumbing, instead of manually dosing the pool with chlorinating chemicals. Chlorine generators avoid the need for constant handling of sanitizing chemicals, and can generate sanitizing power at a lower cost than the equivalent chemicals, but they have a large up-front cost for the apparatus and for the initial loading of the pool with salt. The salt content gives the pool water a brackish taste, but not as salty as seawater. Pool water that splashes and evaporates, such as on a pool deck, leaves a salt residue. Being closer to isotonic salinity than fresh water, saltwater pools have an easier feel on the eyes, and a touch typically characterized as "silky", not unlike bath salts.

For most swimming pools, regular (usually at least weekly) shock treatments are typically necessary to rid the pool of bacteria, lipids and other impurities. Common shock treatments include calcium hypochlorite. There are several disadvantages to weekly shock treatments, including that the chemical calcium hypochlorite is an extremely strong chemical, and can be harmful to contact with the skin, as well as if inhaled. Additionally, the use of chemicals requires swimming pool users everywhere to perform at-home approximate stoichiometry, which may prove difficult. Over time, people may become frustrated with the condition of their pool and decide that draining may be a better option to clean the pool enclosure, obtain "clean" water, and avoid the continuous use of harsh chemicals. Of course, draining a swimming pool can be an expensive, environmentally unfriendly, and enclosure-damaging proposition (as sometimes enclosures warp after the weight of the water is lifted).

While human contact with fountains, ponds and the like is less intense than that of swimming pools, there may still be a need to periodically rid these bodies of water of bacteria and/or algae build up. Of course, special consideration should be used in instances where these bodies of water contain wildlife, such as vegetation, fish, birds and/or the like.

There is a need for alternative mechanisms for impurity maintenance of enclosed bodies of water for mechanical, aesthetic and hygiene purposes.

SUMMARY OF THE INVENTION

In various representative aspects, the present invention provides a system and method for maintenance of an enclosed body of water. Representative aspects of the invention are based on a technique known as lime softening. Several chemicals are added to a body of water containing unwanted mineral hardness and mixed to assist dispersion. These chemicals react with the hardness minerals making them insoluble. The resulting precipitate falls out of solution to the bottom of the body of water for subsequent removal via a filtration system. This eliminates or otherwise reduces the need for new water to be added to the body of water for draining purposes.

The disclosed process kills and removes all forms of bacteria and algae found in the body of water. Additional advantages of the present invention will be set forth in the Detailed Description which follows and may be apparent from the Detailed Description or may be teamed by practice of exemplary embodiments of the invention. Still other advantages of the invention may be realized by means of any of the instrumentalities, methods or combinations particularly pointed out in the Claims.

BRIEF DESCRIPTION OF THE DRAWINGS

Representative elements, operational features, applications and/or advantages of the present invention reside inter alia in the details of construction and operation as more fully hereafter depicted, described or otherwise identified—reference being made to the accompanying drawings, images, figures, etc. forming a part hereof, wherein like numerals (if any) refer to like parts throughout. Other elements, operational features, applications and/or advantages will become apparent in light of certain exemplary embodiments recited in the disclosure herein.

Figure 1:
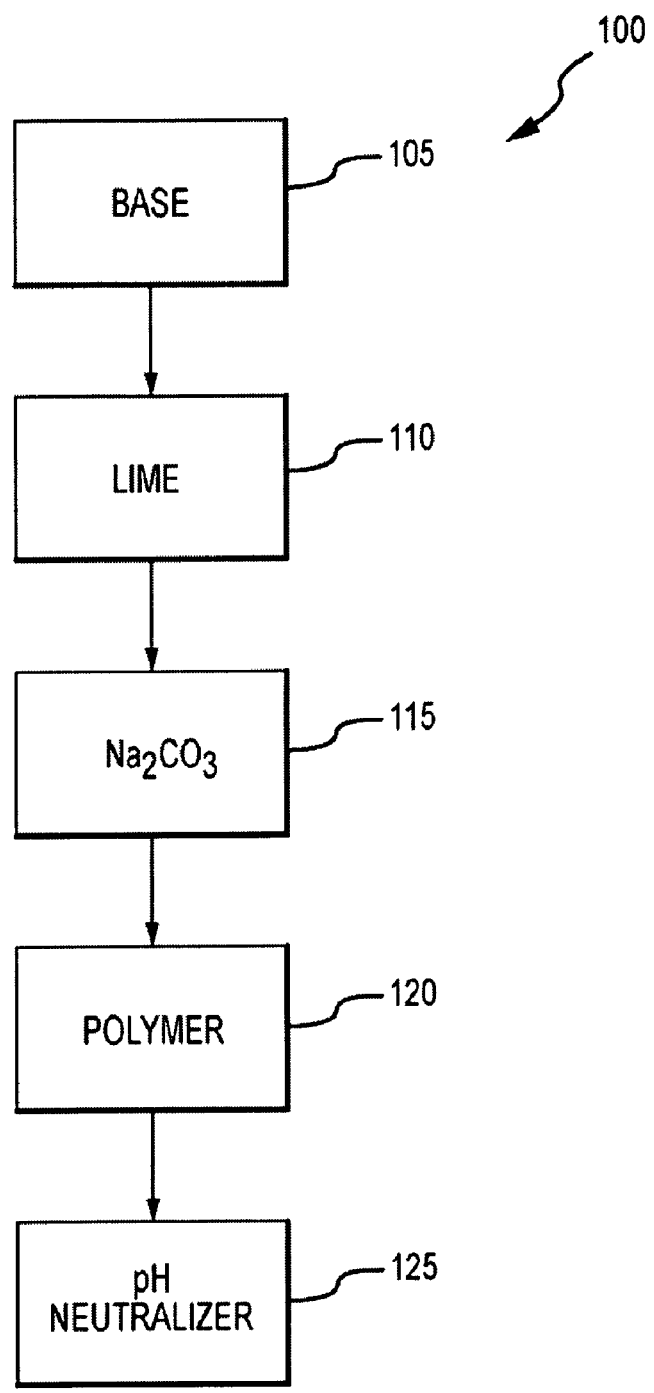
FIG. 1 illustrates a block diagram flowchart of a chemical process in accordance with a representative embodiment of the present invention.

It will be appreciated that elements in the figures, drawings, images, etc. are illustrated for simplicity and clarity and have not necessarily been drawn or otherwise depicted to scale. For example, the dimensions of some of the elements in the figures may be exaggerated relative to other elements to help improve understanding of various embodiments of the present invention. Furthermore, the terms 'first', 'second', and the like herein (if any) are used inter alia for distinguishing between similar elements and not necessarily for describing a sequential or chronological order. Moreover, the terms 'front', 'back', 'top', 'bottom', 'over', 'under', and the like in the disclosure and/or in the claims (if any) are generally employed for descriptive purposes and not necessarily for comprehensively describing exclusive relative position. The preceding terms so used may be interchanged under appropriate circumstances such that various embodiments of the invention described herein, for example, are capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventor's conception of the best mode, and are not intended to limit the scope, applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

Various representative implementations of the present invention may be applied to any system for the chemical or mechanical removal of impurities from enclosed bodies of water. Certain representative implementations may include, for example, application of a lime softening technique to an enclosed body of water, the filtration of precipitated mineral hardness (or other particulate impurities) from an enclosed body of water, and the provision of a substantially unitary mobile unit for performing these steps.

A detailed description of an exemplary application, namely a method for maintaining mineral hardness balance of an enclosed body of water, is provided as a specific enabling disclosure that may be generalized to any application of the disclosed system and method for separation and filtration of any particulate material from an enclosed body of water in accordance with various representative embodiments of the present invention.

Impurities, in accordance with various aspects of the present invention, may comprise any undesirable particulate material in a body of water. Common impurities generally include, for example: mineral hardness, lipids, proteins, bacteria, algae, organic material, inorganic material, and/or the like. In a representative embodiment of the present invention, the removal of impurities in an enclosed body of water may be performed via a lime softening technique in conjunction with utilization of a mobile filtration system. More particularly, impurities may be at least partially rendered as at least partially insoluble material that may be subsequently removed via filtration with a mobile treatment and filtration unit.

Lime softening is a technique involving manipulation of pH of a body of water in order for minerals and other impurities to at least partially precipitate so that these impurities may subsequently be removed through filtration, separation and/or the like. In a representative embodiment of the present invention, lime softening involves utilization of a solubility constant modifier to affect precipitation of, for example, mineral hardness material. In another representative embodiment of the present invention, lime softening may be implemented to bring mineral hardness of a body of water to below 200 parts per mill ion (ppm), 150 ppm and/or 100 ppm. In yet another representative embodiment of the present invention, lime softening may be implemented to bring mineral hardness of a body of water down to 10 ppm, and subsequently allowing the body of water to reach an equilibrium ppm that is at above 10 ppm but below about 200 ppm.

Referring now to FIG. 1, in a representative embodiment of the present invention, a lime softening technique 100 generally comprises utilization of a lime 110, sodium carbonate (also known as soda ash) 115, a polymer 120, and carbon dioxide 125. In a representative embodiment of the present invention, a base 105 may optionally added in bodies of water where water hardness concentrations may be about 2000 ppm or greater. The base 105, in accordance with the present invention, may comprise any suitable composition with the ability to accept protons, thereby increasing the pH of a solution upon addition to above about 9.6 and potentially to above approximately 11. In a representative embodiment of the present invention, a base may comprise sodium hydroxide. In another representative embodiment of the present invention, a base 105 may be added in conjunction with lime $Ca(OH)_2$ 110 and sodium carbonate 115.

In a representative embodiment of the present invention, lime 110 is added to precipitate carbonated minerals. In another representative embodiment of the present invention, a lime 110 and sodium carbonate 115 are added sequentially to an enclosed body of water. The time 110 may comprise a solid or powder form, and may be mixed with the sodium carbonate 115 and water sequentially or conjunctively with addition of lime 110 to a body of water.

It should be appreciated that sodium carbonate 115, in accordance with various representative aspects of the present invention, may be delivered via any suitable mechanism. In a representative embodiment of the present invention, sodium carbonate 115 and lime 110 may be added sequentially with a base 105 to a body of water in order to raise the pH and/or to initiate coagulation and/or the like. In another representative embodiment of the present invention, sodium carbonate 115 may be added to precipitate non-carbonated minerals. In yet a further representative embodiment of the present invention, a polymer 120 may be added in conjunction and/or sequentially with sodium carbonate 115.

It should be appreciated that the polymer 120, in accordance with various representative aspects of the present invention, may comprise any suitable cationic polymer to assist with the flocculation and/or coagulation of non-carbonated minerals. In a representative embodiment of the present invention, the polymer 120 may comprise ATI40L (Anterra Group, Inc., Mission Viejo, Calif., USA). In another representative embodiment of the present invention, upon flocculation, insoluble particulate material will generally sink in an enclosed body of water, allowing for ease of removal through a submersible suction device in conjunction with a filtration system.

In accordance with various aspects of the present invention, upon removal of insoluble material from the water being treated, a pH neutralizer 125 may be added to restore neutrality. It should be appreciated that a pH neutralizer 125, in accordance with various aspects of the present invention, may comprise any acid having a substantially high PKA value and/or the ability to donate protons substantially rapidly. In a representative embodiment of the present invention, the pH neutralizer may comprise hydrochloric acid, sulfuric acid and/or carbonic acid. In another representative embodiment of the present invention, the pH neutralizer 125 may comprise carbonic acid that may be produced in situ from the bubbling of carbon dioxide in water. As a particularly economical and safe acid, carbon dioxide may be easily (and safely) transported and utilized in conjunction with a lime softening technique and filtration system of the present invention.

In a representative embodiment of the present invention, the lime softening technique 100 may be implemented with virtually any enclosed body of water. In another representative embodiment of the present invention, the lime softening technique 100 may be applied to an enclosed body of water with the stoichiometry of the lime softening suitably adapted to take into account the dimensions of the enclosed body of water.

For example, in a representative embodiment of the present invention, a sample from an enclosed body of water is taken prior to treatment with the lime softening technique 100. A standard titration may be performed to determine the initial hardness of the water. Once the initial hardness is determined, bench tests may determine total hardness, bicarbonate alkalinity, total alkalinity, free carbon dioxide and/or the like.

In another representative embodiment of the present invention, a sample from an enclosed body of water may be treated with the lime softening technique 100 to determine the lime softening technique's 100 effectiveness on the body of water. For example, a 500 ml sample may be utilized for this determination with 0.4 g lime 110 added. Thereafter, 0.6 g of sodium carbonate 115 may be added to the sample and subsequently mixed with 1 ml of liquid polymer. The contents of the sample may then be left to coagulate. Once this occurs, a sample from the top of the mixture may be taken to determine if the hardness falls below 100 ppm, and if so, the ratios of the lime 110, sodium carbonate 115 and polymer 120 are scaled up by appropriate stoichiometric ratios for the entire enclosed body of water.

In another representative embodiment of the present invention, a lime softening technique 100 may be applied to a swimming pool comprising representative initial readings of: magnesium=32 mg/L as Mg; total hardness=345 mg/L as $CaCO_3$; bicarbonate alkalinity=156 mg/L as $HCO_3$—; total alkalinity=128 mg/L as $CaCO_3$; and carbon dioxide=5 mg/L as $CO_2$. In order to substantially maximize the effectiveness of the lime softening, a calculation of lime 110 and sodium carbonate 115 dosage should be performed. In order to determine this, all concentrations of initial readings may be converted to equivalent $CaCO_3$ concentrations. This determination may be performed using equivalent weights as follows: Ca=20; Mg=12; $HCO_3$—=61; $CO_2$=22; and $CaCO_3$=50. Now, expressing all concentrations as $CaCO_3$ concentrations, we have:

magnesium (32 mg/L) (50/12)=133.33 mg/L as $CaCO_3$;

total hardness (no conversion needed)=345 mg/L as $CaCO_3$;

Bicarbonate alkalinity (156 mg/L)(50/61)=127.87 mg/L as $CaCO_3$;

Total alkalinity (no conversion needed)=128 mg/L as $CaCO_3$; and

Carbon dioxide (5 mg/L)(50/22)=11.36 mg/L as $CaCO_3$;

Lime 110 dosage may be determined using the following equation:

Lime dosage=[CO2]+[$HCO_3$—]+[Mg]+[excess desired]

In this representative case, the lime dosage needed corresponds to about 11.36 mg/L+128 mg/L+133.33 mg/L+0= (272.69 mg/L as $CaCO_3$) (28/50)=95.12 mg/L as CaO.

Sodium Carbonate 115 dosage may be determined using the following equation:

Sodium Carbonate dosage=[total hardness]−[$HCO_3$—]+[excess]=345 mg/L−128 mg/L+0= (217 mg/L as $CaCO_3$)(28/50)=29.54 mg/L as $Na_2CO_3$.

Figure 2:
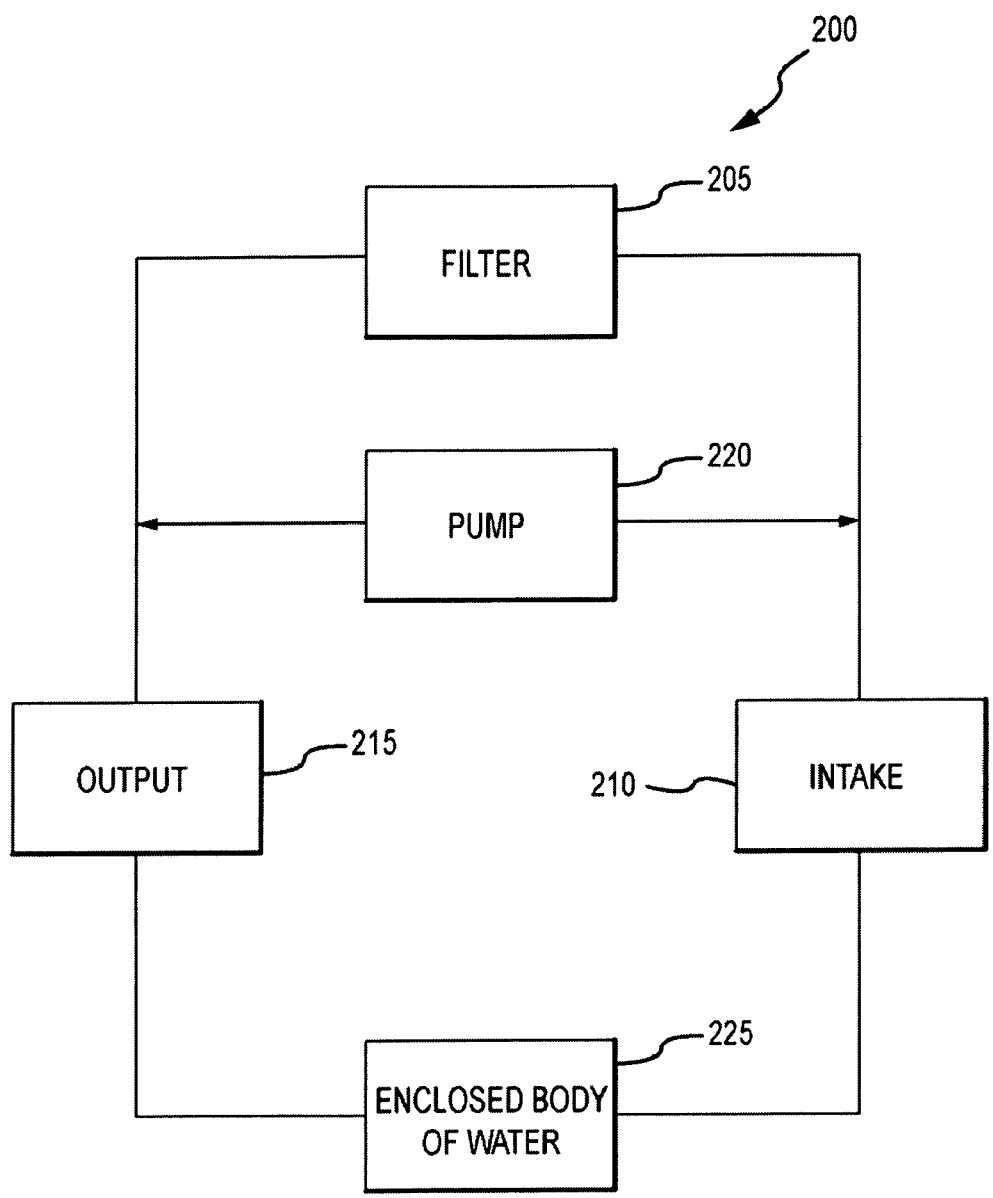
FIG. 2 illustrates a block diagram of a filtration system in accordance with a representative embodiment of the present invention.

It should be appreciated that in accordance with various aspects of the present invention, the lime softening process may be implemented in conjunction with a filtration system. Referring now to FIG. 2, a filtration system 200 comprises a filter 205, an intake 210, an output 215, and a pump 220. The filtration system 200 may be selected or otherwise suitably adapted to filter an enclosed body of water 225. The filtration system 200, in accordance with various aspects of the present invention, generally comprises a closed-loop system such that post-filtered water is returned to the enclosed body of water.

It should be appreciated that in accordance with the present invention, a filter 205 may comprise any suitable mechanism for separation of insoluble particles from a fluid. In a representative embodiment in accordance with the present invention, a filter 205 may comprise a demineralization device, such as, for example, a J-Press® (Siemens Water Technologies, Corp., Holland, Mich.) or any other filter device whether now known or otherwise hereafter described in the art, and/or the like.

It should be appreciated that in accordance with the present invention, a J-Press may be suitably configured to trap various insoluble materials as water runs through a series of filter plates. In a representative embodiment of the present invention, the filter plates of a J-Press generally comprise polypropylene plates. In another representative embodiment of the present invention, these plates are substantially parallel and are suitably configured to move along a rail, so as to enable separation of the plates and/or creation of space between the plates. In another representative embodiment of the present invention, the plates may be separated in order to remove accumulated insoluble material. In yet a further representative embodiment of the present invention, removal of insoluble material from the plates of filter 205 may be performed by scraping, picking, vibrating, shaking and/or the like.

Filter 205, in accordance with various representative aspects of the present invention, may be connected to intake 210 and output 215. It should be appreciated that intake 210 may comprise any device suitably configured or otherwise adapted to transfer fluids. For example, representative devices and/or device components may include a hose, a pipe, a tube and/or the like. In a representative embodiment of the present invention, intake 210 draws water from the body of water 225 to the filter 205. In another representative aspect of the present invention, intake 210 may be suitably adapted to draw water comprising insoluble materials from the body of water 225 to the filter 205.

It should further be appreciated in accordance with various aspects of the present invention, that intake 210 may connected, either directly or indirectly, to the filter 205. In a representative embodiment of the present invention, intake 210 may connected to the filter 205 indirectly, wherein intake 210 comprises a hose that is coupled to piping that is configured to transfer (or otherwise communicate) water from intake 210 to the filter 205. In another representative embodiment of the present invention, the hose and/or piping may be implemented in conjunction with clear pieces of piping to visually assist with monitoring the movement of various chemicals of the lime softening technique 100, of insoluble particulate material and/or water. In yet another representative embodiment of the present invention, the clear plastic piping may be implemented at or near junctions between hoses and/or pipes.

It should be appreciated that in accordance with various aspects of the present invention, output 215 may comprise any device suitably configured to communicate fluids. Representative devices and/or device components may include a hose, a pipe, a tube and/or the like. In a representative embodiment of the present invention, output 215 communicates water from the filter 205 to the body of water 225. In another representative embodiment of the present invention, output 215 may be suitably adapted to return water substantially free of insoluble materials from the filter 205 to the body of water 225.

It should further be appreciated, in accordance with various aspects of the present invention, that output 215 may be connected, either directly or indirectly, to the filter 205. In a representative embodiment of the present invention, output 215 may be connected to the filter 205 indirectly, wherein output 215 may comprise a hose that is coupled to piping, which transfers (or otherwise communicates) water from the filter 205 to the body of water.

It should be appreciated that in accordance with various aspects of the present invention, that output 215 may suitably configured to introduce lime 110, sodium carbonate 115 and/or polymer 120 to the body of water. In a representative embodiment of the present invention, output 215 may be suitably configured to communicate these chemicals sequentially or simultaneously. In another representative embodiment of the present invention, one or more valves may be present to regulate movement of various chemicals through output 215.

In another representative embodiment of the present invention, output 215 may be suitably configured to transfer a pH neutralizer 125, such as carbon dioxide 125, to the body of water 225 after and/or in conjunction with return of substantially post-filtered water.

It should be appreciated that in accordance with various aspects of the present invention, pump 220 may comprise any suitable mechanism for generating power to enable movement of water through the filtration system 200. In a representative aspect of the present invention, pump 220 may comprise a positive displacement pump, such that the pump does not need to be primed prior to use. In another representative embodiment of the present invention, pump 220 may comprise a double diaphragm positive displacement pump. In yet a further representative embodiment of the present invention, pump 220 may be powered by operation of an automotive engine, such as through a shaft which drives an air compressor, thereby substantially providing a flow of relatively high cubic feet per second with high demand availability and rapid duty cycle. In yet a further representative embodiment of the present invention, pump 220 may comprise a rotary screw air compressor, which may be rated up to 200 csm at 150 p.s.i., and does not generally require a reservoir.

Figure 11:
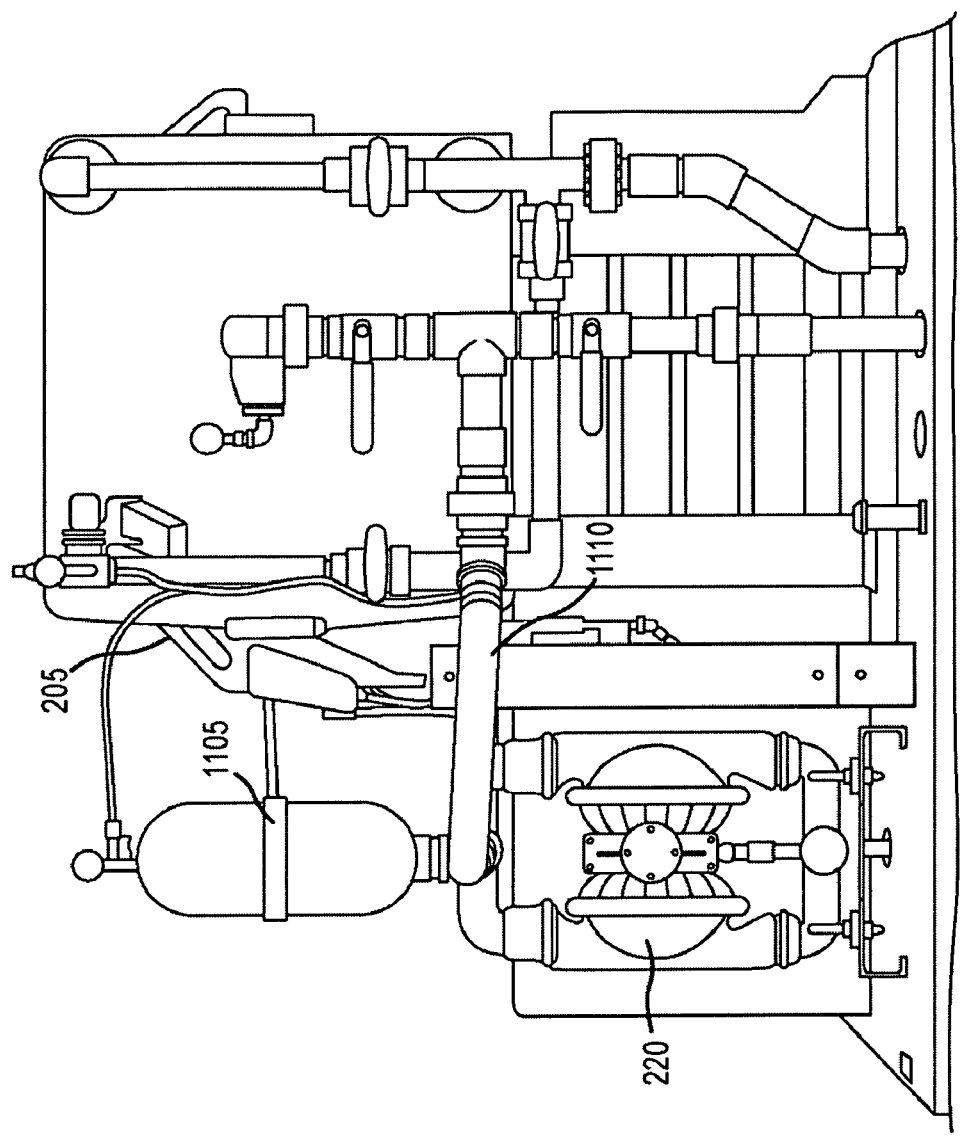
FIG. 11 is a rear view of a mobile filtration system in accordance with a representative embodiment of the present invention.

It should be appreciated that in a representative embodiment of the present invention, a pulse dampener may be optionally implemented in conjunction with pump 220. For example, referring now to FIG. 11, pulse dampener 1105 may be connected to pump 220 via connector 110, and may be suitably adapted to receive water from pump 220 and/or reduce any "water hammer effect" and/or even out the flow of water from pump 220. The pulse dampener 1105 may comprise, for example, a Sentury pulsation dampener (BLACOH FLUID CONTROL, Riverside Calif., USA).

It should be appreciated in accordance with the present invention that various accessories may be implemented in conjunction with the filtration system 200 including: baffles, circulation pumps, submersible suction devices and/or the like. It should be appreciated that baffles, in accordance with representative embodiments of the present invention, may be optionally implemented to assist in delivery of various chemicals of the lime softening technique 100 to the body of water and/or assist in delivery of post-filtered water back to the body of water. The baffle may comprise any suitable mechanism for resisting submersion and at least partially providing a platform and/or eductor for delivery of the base 105, lime 110, sodium carbonate 115 and/or polymer 120.

Figure 3:
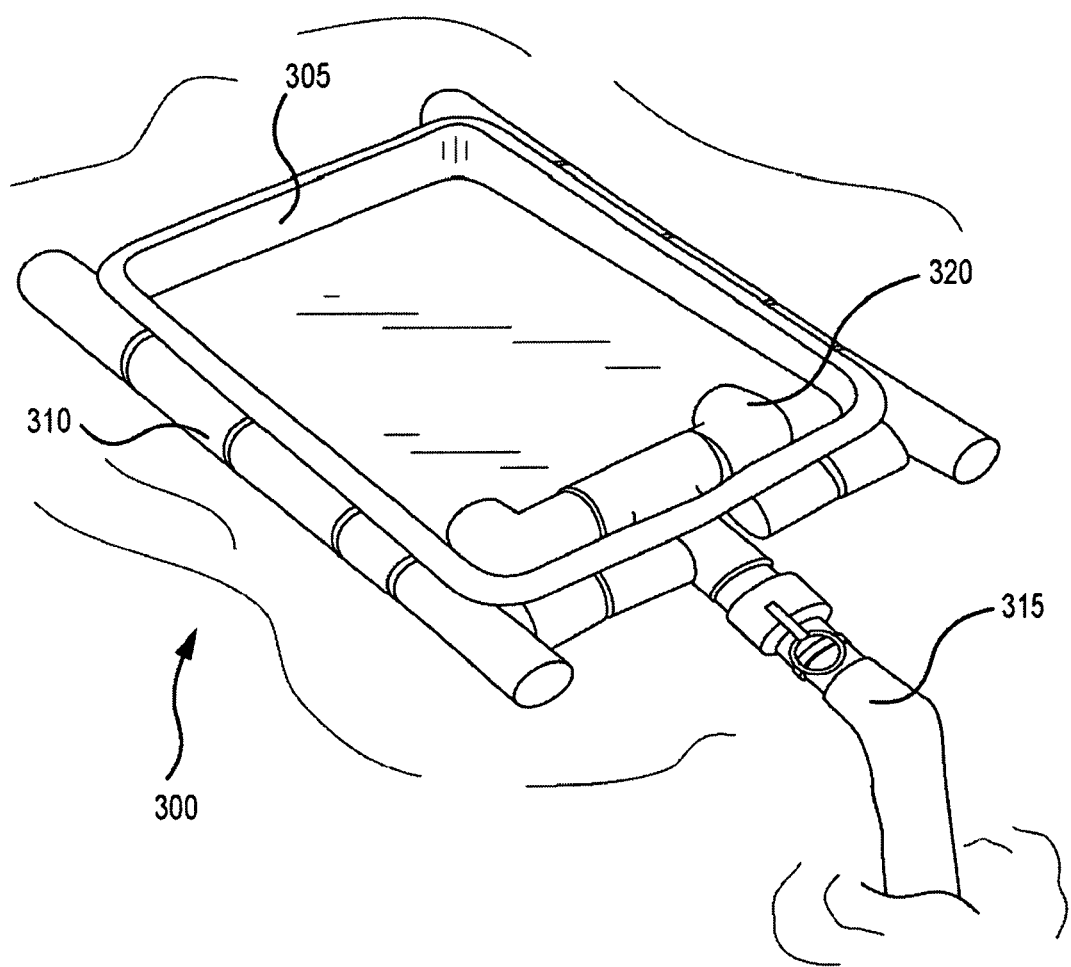
FIG. 3 illustrates a float device in accordance with a representative embodiment of the present invention.

Referring now to FIG. 3, baffle 300 may comprise a bin 305 with foam edging 310 for flotation. Baffle 300 may be connected to output 215. In a representative embodiment of the present invention, baffle 300 may be connected to output 215 via hose 315 and PVC piping 320. The hose may be suitably configured to deliver base 105, lime 110, sodium carbonate 115 and/or polymer 120 to baffle 300. In a representative embodiment of the present invention, PVC piping 320 may comprise an expanded Y-shape having a plurality of openings to substantially uniformly distribute the chemicals in combination with water to baffle 300.

In another representative embodiment of the present invention, baffle 300 may be connected to output 215 and may be suitably adapted to deliver post-filtered water back to the body of water in such a way as not to disturb the particulate material to be removed at and/or near the bottom of the body of water. In another representative embodiment of the present invention, baffle 300 may be implemented to at least partially diffuse high velocity water coming from output 215. In yet another representative embodiment of the present invention, the baffle may comprise a split-flow regulator so as to assist in diffusion of high velocity water flow from output 215.

A circulation pump, in accordance with various aspects of the present invention, may be optionally implemented in conjunction with the filtration system 200 to assist in circulation and/or agitation of the body of water throughout treatment with the lime softening technique 100. Circulation of the body of water generally assists with uniform distribution of the chemicals of the lime softening technique 100, as well as substantially uniform flocculation and/or coagulation.

Figure 4:
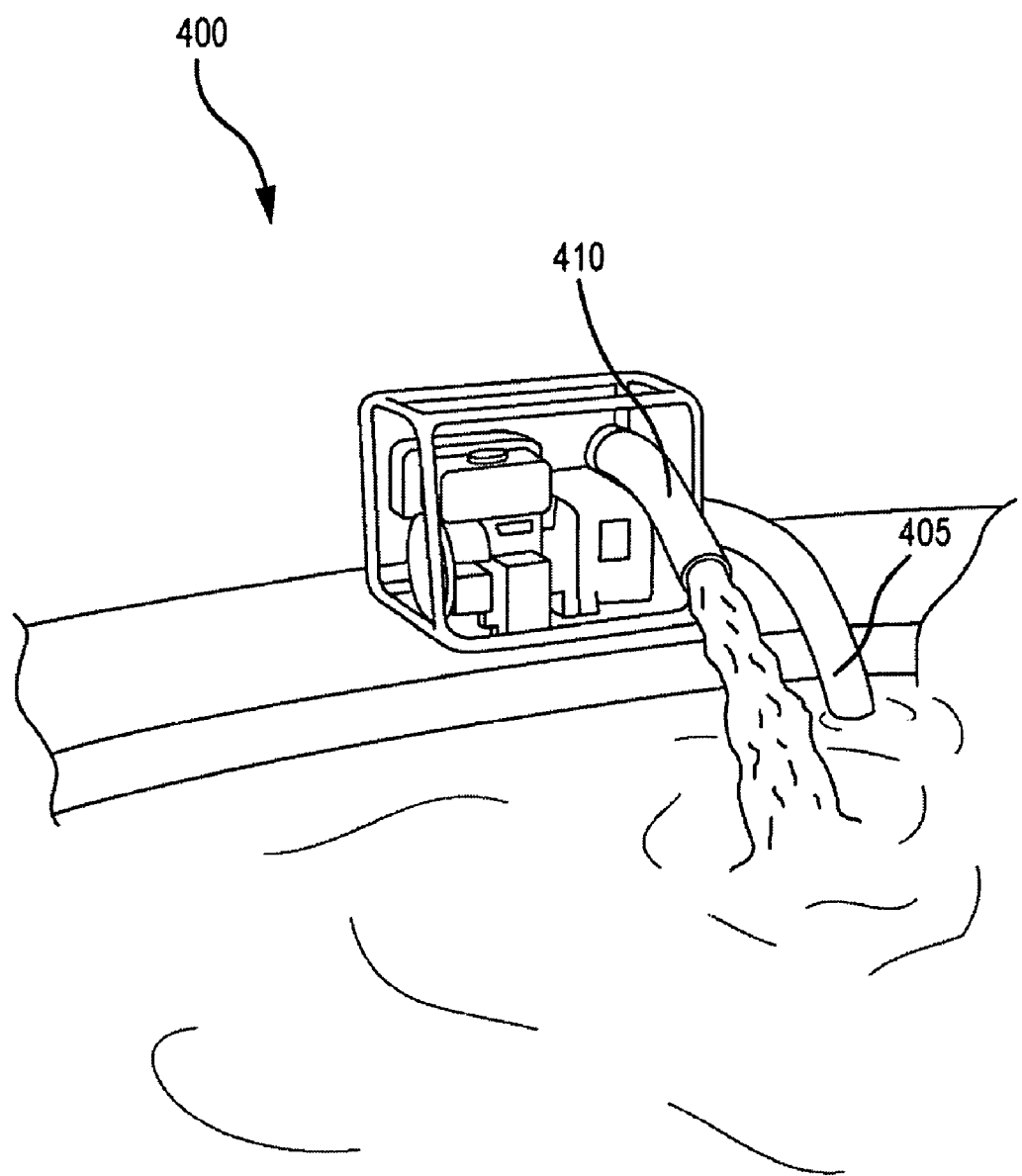
FIG. 4 illustrates a perspective view of a circulation pump in accordance with a representative embodiment of the present invention.

Referring now to FIG. 4, circulation pump 400 may be placed near the edge of an enclosed body of water, such as a swimming pool. Circulation pump 400 may comprise a circulation intake 405 and a circulation output 410 for the circulation of water. In a representative embodiment of the present invention, intake 405 may be at least partially submerged. In another representative embodiment of the present invention, intake 405 may be weighted so that it substantially remains at or near the bottom of the body of water (e.g., a pool). This may be a particularly effective way to ensure that circulation from the bottom to the top of the pool occurs. In another representative embodiment of the present invention, circulation output 410 of the circulation pump 400 may not be submerged, but may be alternatively placed above the pool, so as to dissipate water drawn by the circulation intake 405 from the bottom of the pool to the top of the pool.

Figure 12:
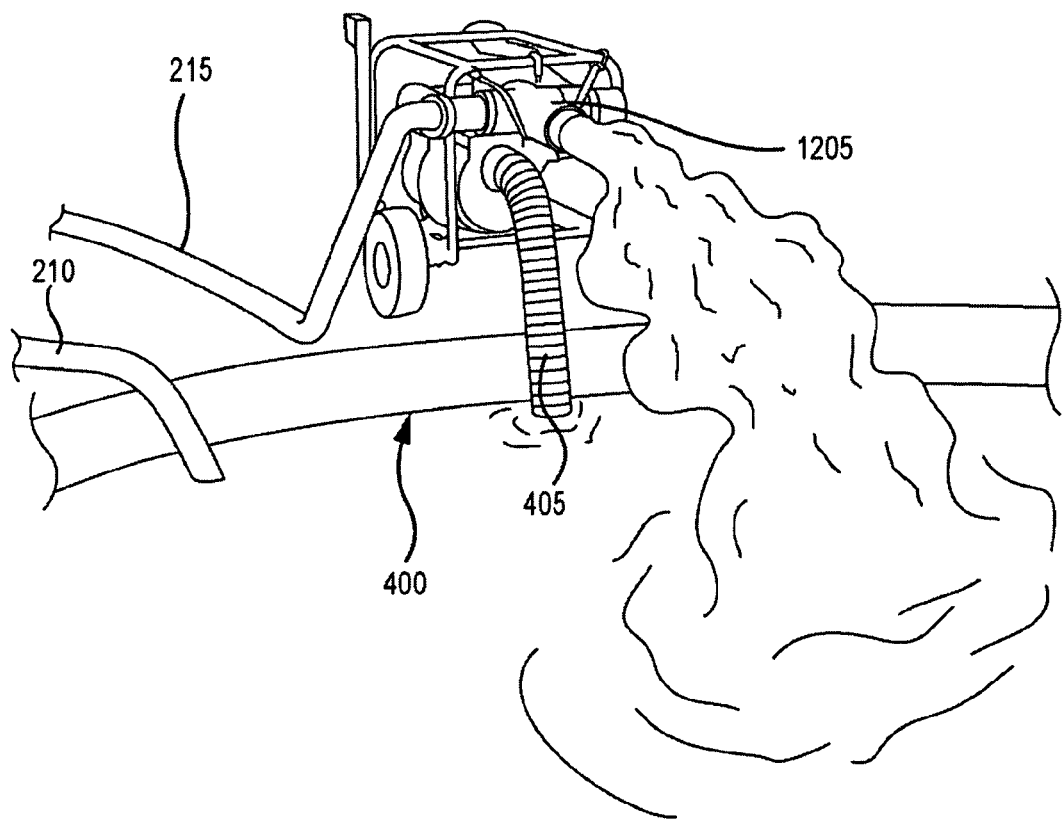
FIG. 12 is a three-quarter perspective view of a circulation pump of a mobile filtration system in accordance with a representative embodiment of the present invention.

It should be appreciated that in accordance with various aspects of the present invention, a dispersal manifold may be optionally implemented in conjunction with and/or at least partially integrated into circulation pump 400. For example, referring now to FIG. 12, dispersal manifold 1205 may be connected to output 215 and may be suitably configured to distribute chemicals of the lime softening technique 100 to the body of water. Dispersal manifold 1205 may comprise a t-shaped pipe, wherein one end of the pipe may be connected to circulation output 410, another end may be connected to output 215, and yet another end may be suitably configured to disperse fluid. The fourth end of dispersal manifold 1205 may be closed. In yet another representative embodiment of the present invention, a t-shaped dispersal manifold allows for flexibility and connective alternatives for various outputs and dispersal components, depending on how the circulation pump 400 is positioned in relation to the body of water.

It should be appreciated that in accordance with the present invention, submersible suction devices may be optionally implemented to assist in removal of insoluble particulate material from the enclosed body of water. Representative submersible suction devices may include pool vacuums, pool vacuum cleaners, robotic pool vacuum cleaners, and/or the like.

Figure 5:
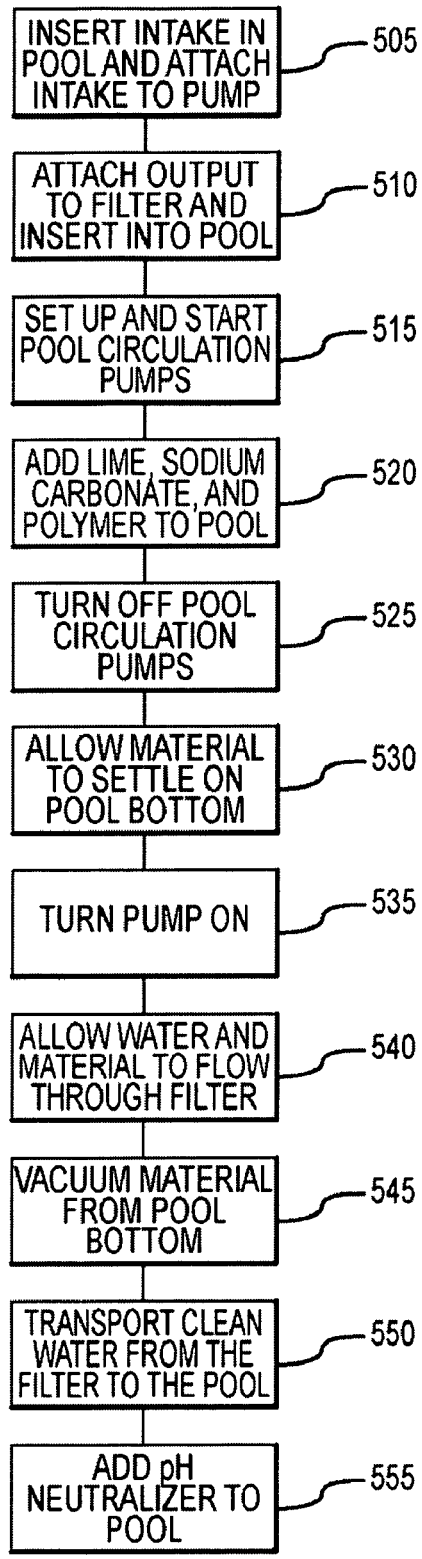
FIG. 5 illustrates a block diagram of a process flow chart for a filtration system in accordance with a representative embodiment of the present invention.

It should be appreciated that in accordance with various representative aspects of the present invention, filtration system 200 may be implemented to clean various enclosed bodies of water. Referring now to FIG. 5, in a representative embodiment of the present invention, filtration system 200 may be implemented sequentially to clean a swimming pool. First, intake 210 may be attached, either directly or indirectly to pump 220 and inserted into the pool [505]. Conjunctively or sequentially, output 215 may be attached to filter 205, either directly or indirectly, and inserted into the pool [510]. Conjunctively or sequentially, circulation pump(s) 400 may be brought to the edge of the pool and primed, intakes 405 weighted and submerged, and then the pump may be started [515]. Thereafter, lime 110, sodium carbonate 115, and polymer 120 may be added, either directly, or via output 215, to the pool [520]. The addition of these chemicals should be closely monitored and stoichiometric amounts should be used. Once the chemicals have been added, the pool circulation pumps may be turned off [525]. At this point, flocculation and/or coagulation of insoluble particulate material occurs and may be allowed to settle towards the pool bottom [530]. Once this occurs, pump 220 may be turned on [535], which powers intake 210 to draw water from the pool to mobile filter 205 [540]. Insoluble particulate material that has settled at and/or near the bottom of the pool may be removed using a submersible suction device, such as a vacuum [545]. Substantially insoluble particulate material-free water (post-filtered) from mobile filter 205 may be brought back to the pool via output 215 [550]. Conjunctively or sequentially, a pH neutralizer 125 may be added, either directly and/or through output 215 and/or a hose and/or pipe to the pool [555].

Figure 6:
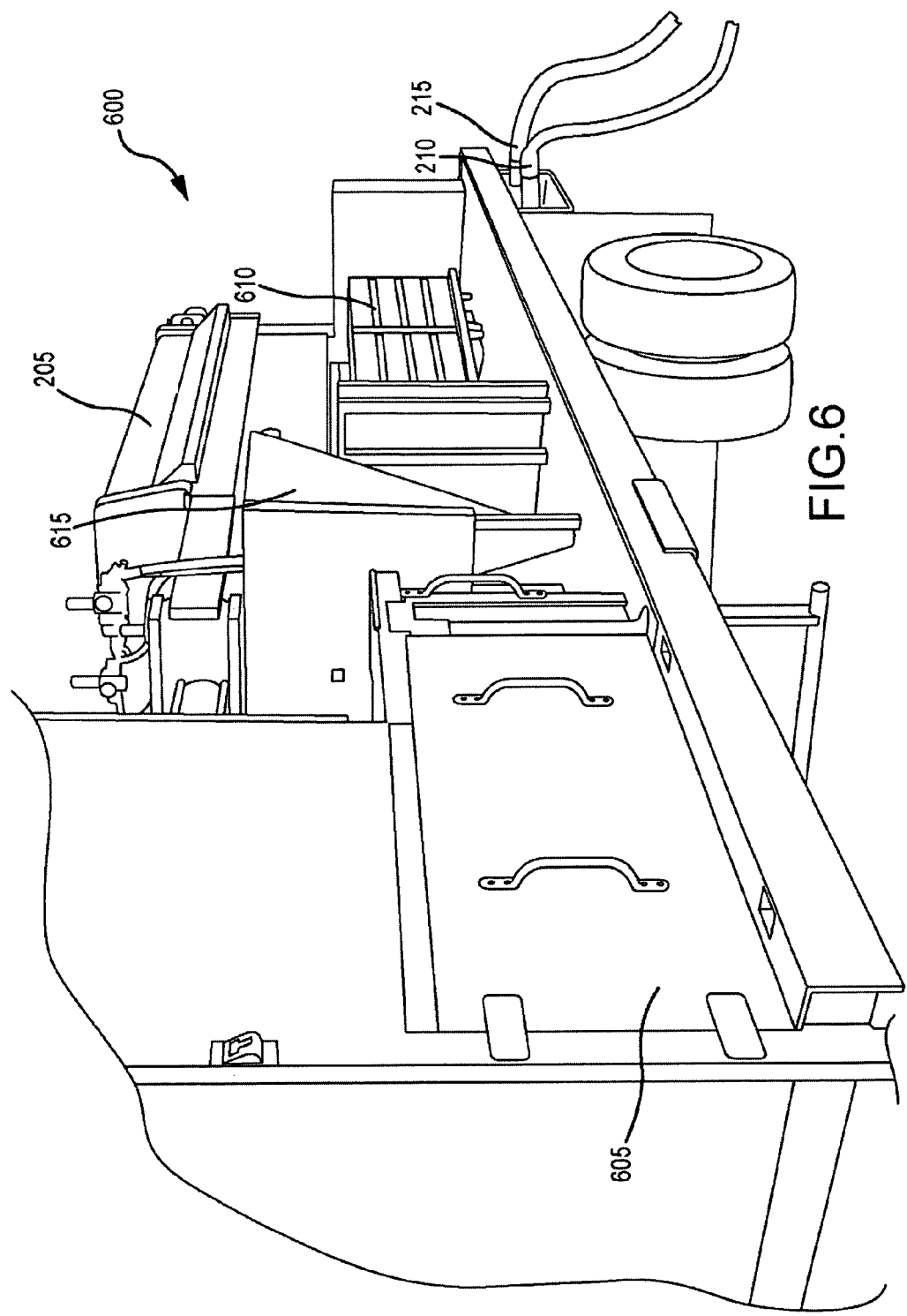
FIG. 6 is a three-quarter perspective of a mobile filtration system in accordance with a representative embodiment of the present invention.
Figure 7:
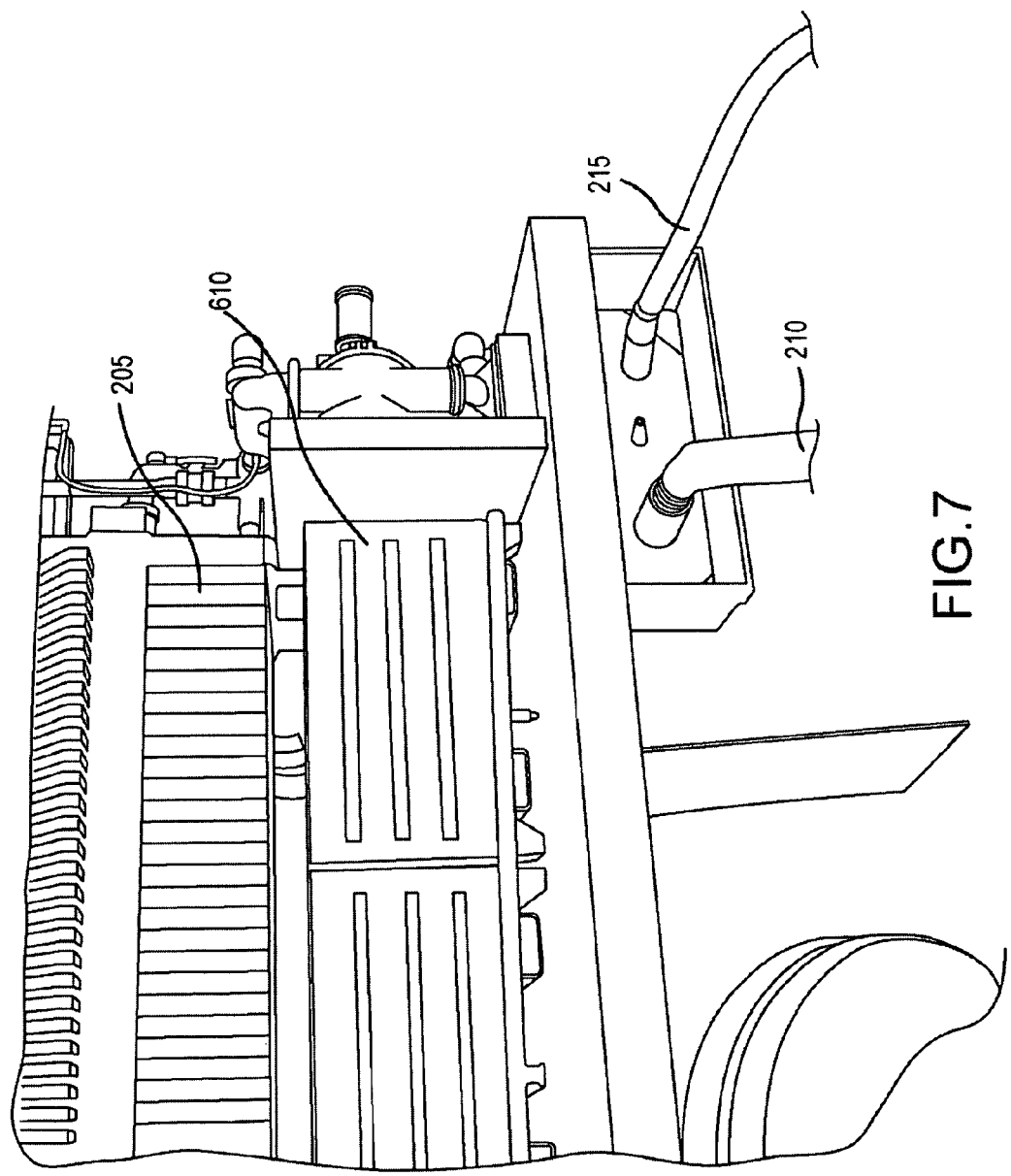
FIG. 7 is a three-quarter rear perspective of a mobile filtration system in accordance with a representative embodiment of the present invention.

It should be appreciated that the system and method for mineral hardness maintenance via a lime softening in accordance with a representative aspect of the present invention may be implemented to comprise an at least partially mobile filtration system. Suitable mechanisms for achieving mobility may include: trucks, trailers, vans, boats, and/or the like. Referring now to FIGS. 6 and 7, in a representative embodiment of the present invention, a mobile filtration unit may comprise a truck 600. Truck 600 generally houses filter 205, intake 210, output 215, and pump 220. Underneath filter 205, on the bed of the truck, is a container 610 suitably adapted to catch and/or house insoluble particulate material collected by filter 205. With the container 610 located underneath filter 205, the plates of the filter 205 may be separated whereby excess particulate matter may be scraped from the plates for collection in the container 610 disposed underneath.

Figure 13:
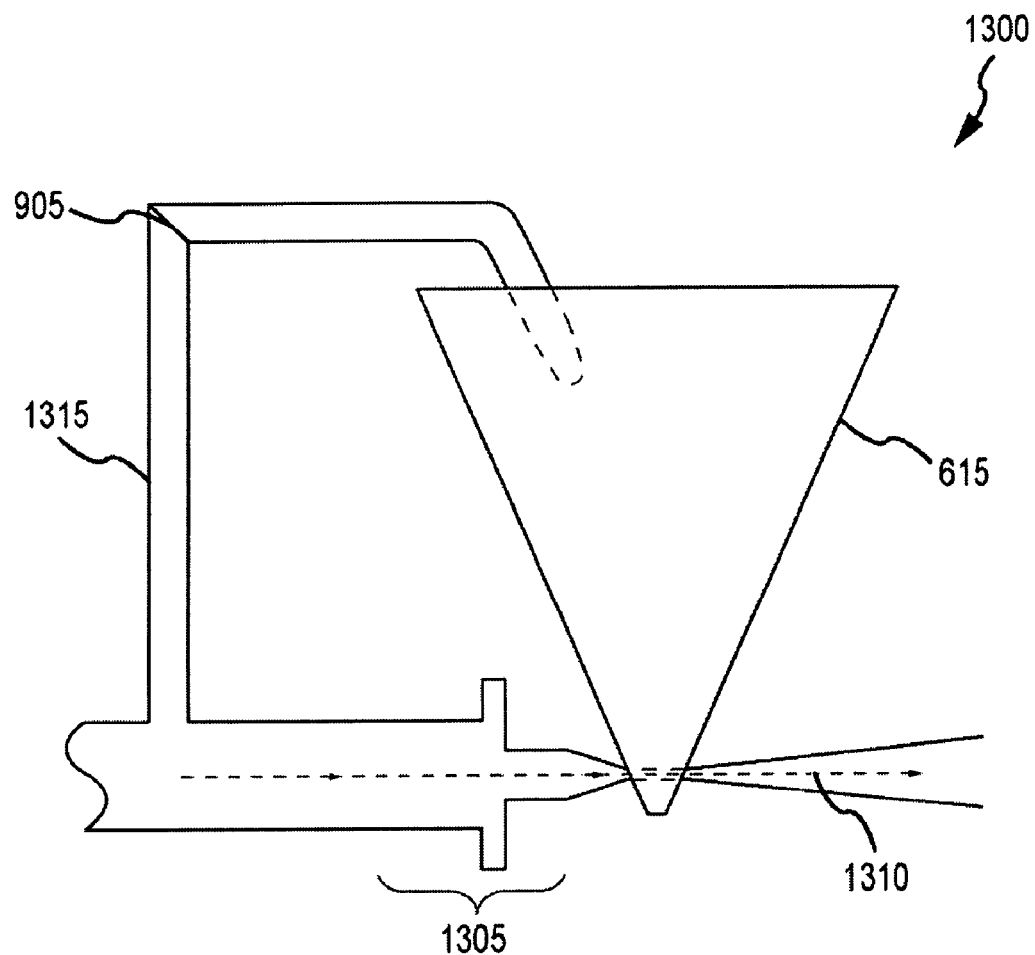
FIG. 13 is a schematic diagram of an eductor of a mobile filtration system in accordance with a representative embodiment of the present invention.

In a representative embodiment of the present invention, truck 600 comprises an eductor that may be used to assist in delivering lime 110 and/or polymer 120 to the body of water. Referring now to FIG. 13, in a representative embodiment of the present invention, eductor 1300 comprises a hopper 615, a pressure connection 1305 a discharge connection 1310, and one or more regulators 1315. The eductor hopper 615 may be positioned between the pressure connection 1305 and the discharge connection 1310, such that hopper 615 may be suitably configured to deliver one or more chemicals of the lime softening technique 100 to the water as it flows through the pressure connection 1305 and the discharge connection 1310. Pressure connection 1305 and discharge connection 1310 may be substantially integrated into piping that transfers (or otherwise communicates) water to output 215.

It should be appreciated that the pressure connection 1305 provides a pressure differential in water as it flows under the eductor hopper 615 so as to force water to increase velocity and/or mix with chemicals such as lime 110 and/or polymer 120 as they are introduced. It should be further appreciated that one or more regulators 1315 may be implemented to assist in regulation of flow of water to eductor 1300 and/or to assist in creation of suction in the eductor hopper 615. In a representative embodiment of the present invention, one or more valves 905 may be present to assist in management of the regulator 1315.

Figure 9:
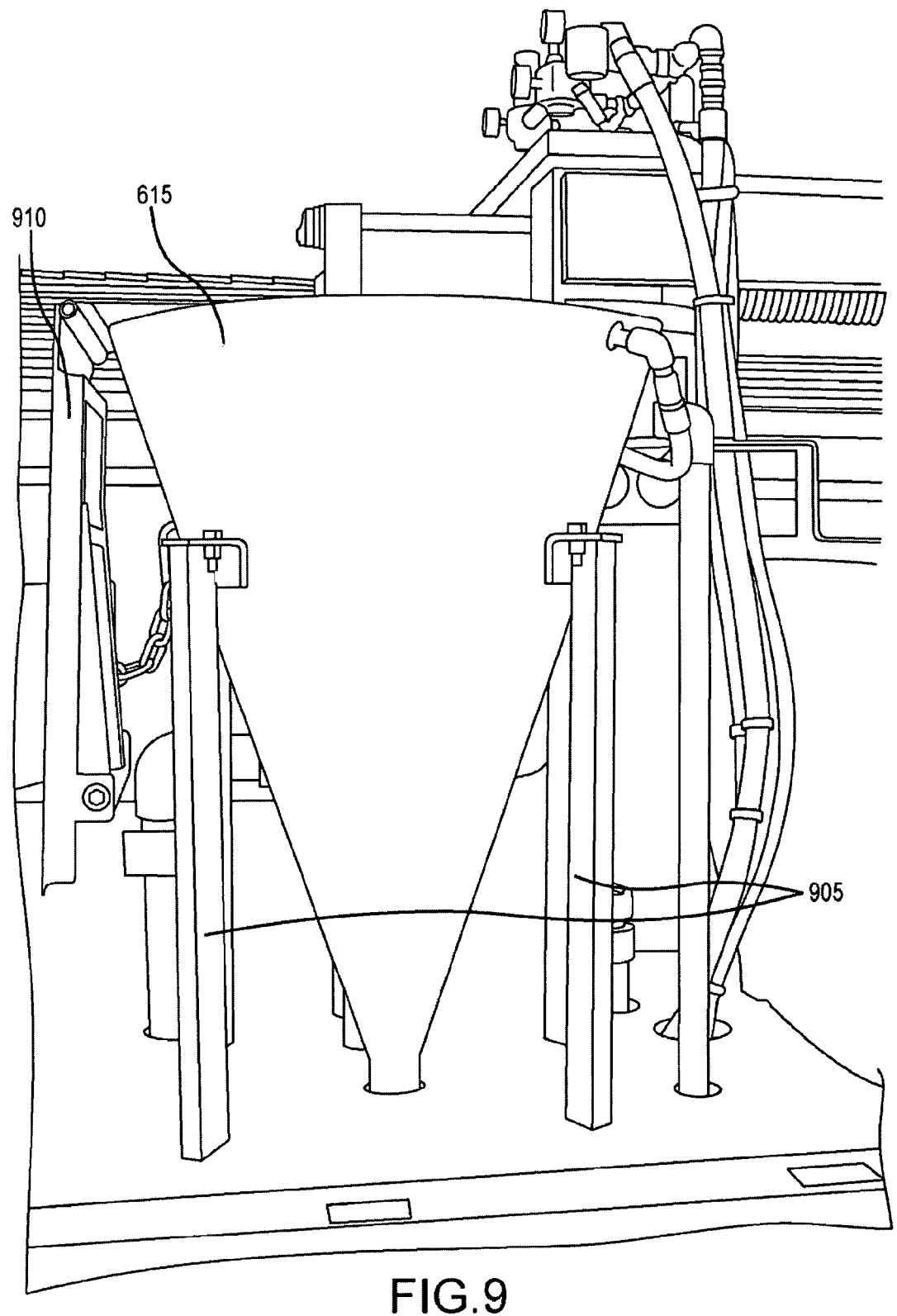
FIG. 9 is a front view of an eductor of a mobile filtration system in accordance with a representative embodiment of the present invention.

Referring now to FIG. 9, in a representative embodiment of the present invention, eductor hopper 615 may be held in place by two or more stands 905, which may be substantially perpendicular to the truck bed. Eductor hopper 615 may comprise a substantially conic and/or funnel-shaped housing and an opening at the bottom (the tapered point of the conic funnel) of approximately 1-3 inches in diameter. It is possible that lime build-up may accumulate at the opening, and regular removal of build-up may be required.

In a representative embodiment of the present invention, eductor hopper 615 may be optionally positioned adjacent to a platform 910. The platform 910 may be adapted to rest substantially parallel to the eductor hopper 615, but may also be suitably configured to fold-out to become substantially perpendicular to the eductor 615, so as to provide a place to set the chemicals. Platform 910 may also comprise an area from which to tip a chemical container to pour chemicals out in a safe and/or controlled fashion.

Figure 10:
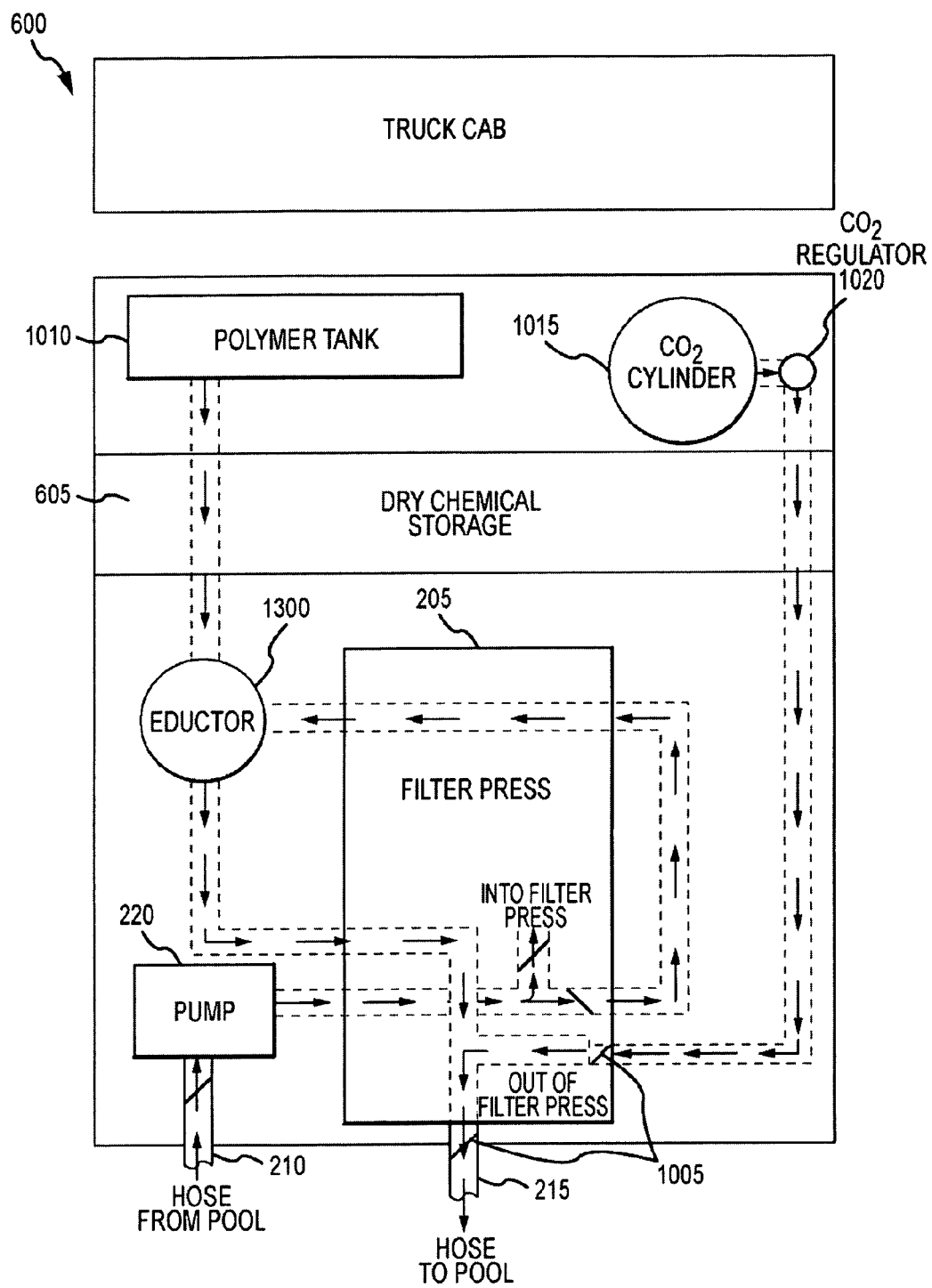
FIG. 10 is a schematic of piping of a mobile filtration system in accordance with a representative embodiment of the present invention.

Referring now to FIG. 10, eductor 1300 may be connected to intake 210 and output 215 via hosing, piping and/or any other suitable mechanism for connection. In a representative embodiment of the present invention, eductor 1300 may be connected to intake 210 via piping. In this representative embodiment, eductor 1300 may be adapted to regulate the introduction of chemicals to the water as it flows through the piping from the intake 210 to the output 215.

In a representative embodiment of the present invention, the movement of chemicals from the eductor 1300 may be regulated by one or more valves 905. These valves 905 may be located in piping near the output 215 and/or the intake 210 and/or integrated into the output 215 and/or the intake 210. In another representative embodiment of the present invention, valves 905 may also control the flow of water from the intake 210 to the filter 205. In yet another representative embodiment of the present invention, valves 905 regulate the flow of water from intake 210 such that the water may flow either to the filter 205 or to the eductor 1300 in order to effect different steps in the filtration system process. In yet a further representative embodiment of the present invention, valves 905 may be suitably configured to allow water to flow first to the eductor 1300 to enable introduction of chemicals to the body of water. Then, after introduction of the chemicals to the body of water is complete, valves 905 may be manipulated to substantially block eductor 1300 thereby allowing water to flow from the intake 210 to the filter 205. In yet a further representative embodiment of the present invention, gauges and meters, such as pH meters and/or the like, may assist in the regulation and/or management of the steps of the filtration system 200.

In a representative embodiment of the present invention, eductor 1300 may be connected directly and/or indirectly to a polymer tank 1010. In another representative embodiment of the present invention, polymer tank 1010 may be configured to house a supply of liquid polymer. In another representative embodiment of the present invention, eductor 1300 may be substantially configured to regulate the introduction of polymer 120 to the water as it flow from the intake 210 to the output 215. In yet another representative embodiment of the present invention, a pump, such as an air diaphragm pump, may be implemented in conjunction with the polymer tank 1010 so as to assist in transfer of the polymer 120 to the eductor 1300. In yet a further representative embodiment of the present invention, the flow of polymer 120 to the eductor 1300 may be controlled by one or more valves 905, regulators and/or the like.

It should be appreciated that in accordance with the present invention, a pH neutralizer 125 may be housed on the truck 600. Referring now to FIG. 10, in a representative embodiment of the present invention, the pH neutralizer 125 may comprise carbon dioxide, and the housing may be a carbon dioxide cylinder 1015. In another representative embodiment of the present invention, the carbon dioxide cylinder 1015 may be connected to the output 215 and is substantially configured to release carbon dioxide to the output 215, either directly or through a connector, such as a pipe, a hose and/or the like. In another representative embodiment of the present invention, truck 600 also houses a carbon dioxide regulator 1020 to regulate the release of carbon dioxide to the output 215. In yet another representative embodiment of the present invention, the carbon dioxide regulator manages and/or works in conjunction with one or more valves 905. In a yet a further representative embodiment of the present invention, these valves 905 may be located remotely, such as near the output 215, or they may be integrated into the carbon dioxide regulator 1020. In another representative embodiment of the present invention, truck 600 may be suitably configured to comprise various storage units 605 where chemicals for the lime softening technique 100, additional hoses, piping and/or the like may be stored.

Figure 8:
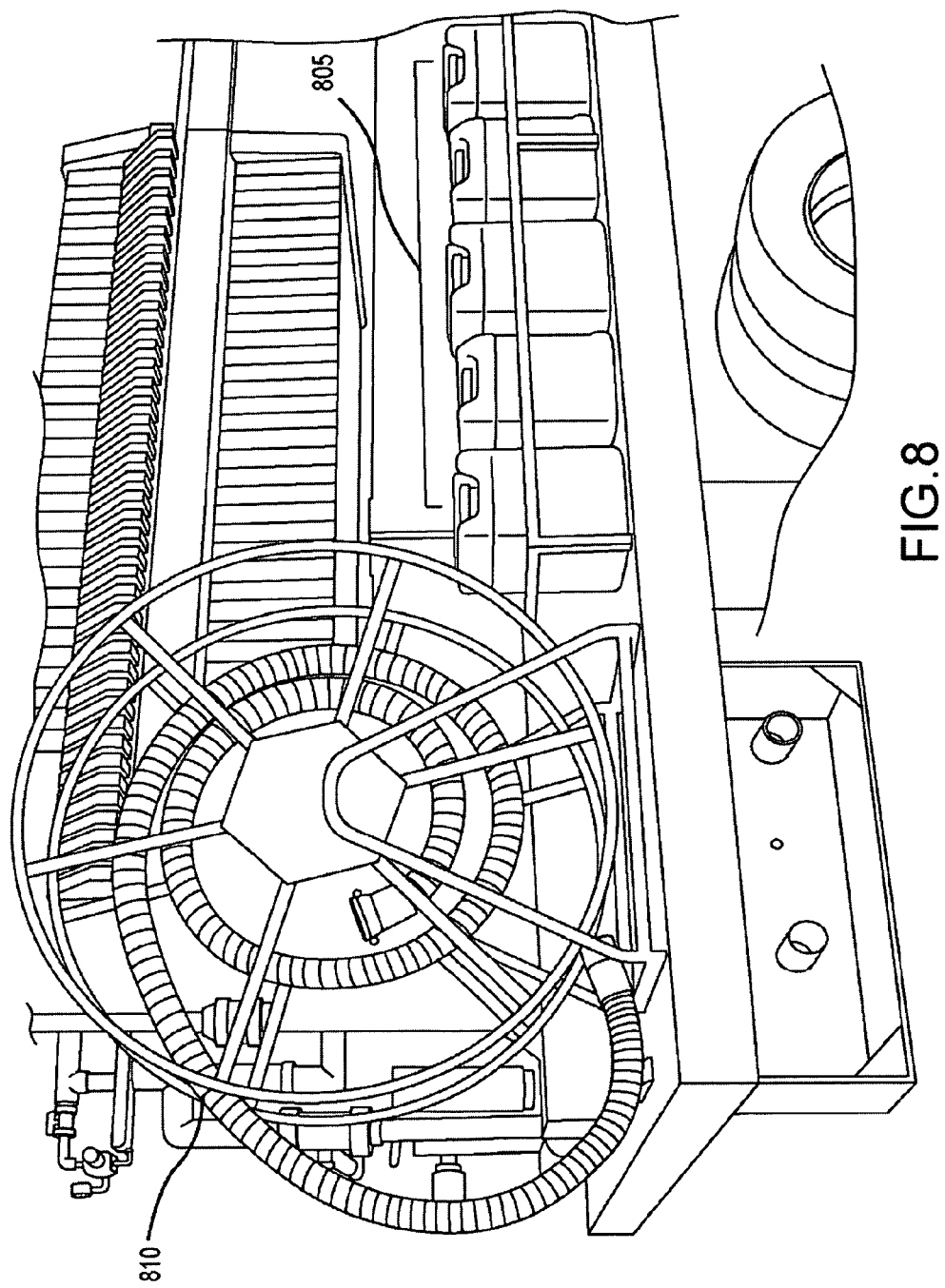
FIG. 8 is a three-quarter perspective of a mobile filtration system in accordance with a representative embodiment of the present invention.

Referring now to FIG. 8, in another representative embodiment of the present invention, truck 600 may be suitably configured to house chemicals in unenclosed storage units 805 for easy access. Additionally, truck 600 may comprise a wheel to house hosing 810.

It should be appreciated that the system and method for mineral hardness maintenance, in accordance with the present invention, provides substantially cleaner water in an enclosed body of water. In a representative embodiment of the present invention, the system may replace the need for weekly shock treatments with chlorine, which can be tedious, expensive, and, with the use of these chemicals at home, also dangerous. In another representative embodiment of the present invention, the system provides an environmentally friendly alternative to draining and/or cleaning swimming pools and/or other enclosed bodies of water. In yet another representative embodiment of the present invention, the system substantially eliminates the need for expensive and/or time-consuming processes of removing mineral deposits, such as through the use of pumice stones, sand blasting and/or the like.

In the foregoing specification, the invention has been described with reference to specific exemplary embodiments; however, it will be appreciated that various modifications and changes may be made without departing from the scope of the present invention as set forth in the exemplary provisional embodiments. The specification and figures are to be regarded in an illustrative manner, rather than a restrictive one and all such modifications are intended to be included within the scope of the present invention. Accordingly, the scope of the invention should be determined by the claims and their legal equivalents. For example, the steps recited in any method or process claims may be executed in any order and are not limited to the specific order presented in the claims. Additionally, the components and/or elements recited in any apparatus embodiment may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components of any or all the provisional embodiments. As used herein, the terms "comprising", "having", "including", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted by those skilled in the art to specific environments, manufacturing specifications, design parameters or other operating requirements without departing from the general principles of the same.

I claim:

1. A filter system for removing mineral hardness of water, the system comprising:
    piping to communicate water containing mineral hardness, communicate water bearing precipitate mineral hardness, and communicate post-filtered water;
    an eductor hopper to add a mineral hardness solubility constant modifier to a flow of water containing mineral hardness as it flows through the piping, the mineral hardness solubility constant modifier being selected to at least partially precipitate insoluble mineral hardness material from the water containing mineral hardness to form water bearing precipitate mineral hardness;
    a filter connected to the eductor hopper by the piping to at least partially remove the precipitated insoluble mineral hardness material from the water bearing precipitate mineral hardness to form post-filtered water;
    a pump connected to the piping to provide pressure sufficient to: communicate the water containing mineral hardness through the piping to the eductor hopper.

2. The system of claim 1, wherein the piping is adapted to deliver the water bearing precipitate mineral hardness to a body of water.

3. The system of claim 1, wherein the mineral hardness solubility constant modifier comprises at least one of a base, lime, sodium carbonate, carbon dioxide, and a polymer.

4. The system of claim 3, wherein the mineral hardness solubility constant modifier is selected to increase the pH of the water containing mineral hardness to above about 9.6.

5. The system of claim 3, wherein the mineral hardness solubility constant modifier is selected to increase the pH of the water containing mineral hardness to above about 11.

6. The system of claim 1, wherein the filter is further configured to at least partially remove at least one other insoluble particulate material selected from the group consisting of proteins, lipids, organic material, and inorganic material.

7. The system of claim 1, further comprising at least one of a dispersal manifold and a circulation pump to at least partially assist in circulating the water bearing precipitate mineral hardness.

8. The system of claim 7, wherein the circulation pump comprises a circulation intake and a circulation output that are configured to communicate the water bearing precipitate mineral hardness from a first location to a second location, wherein the second location is disposed substantially above the first location.

9. The system of claim 7, wherein the dispersal manifold is at least partially integrated into the circulation pump.

10. The system of claim 1, further comprising a baffle to assist with at least one of delivery and dispersal of the mineral hardness solubility constant modifier.

11. The system of claim 1, further comprising a submersible suction device to assist with removal of precipitate material from the water bearing precipitate mineral hardness.

12. The system of claim 1, further comprising at least one of: a valve, a pipe, a gauge, a pressure gauge, a pH meter, a hardness test kit, and a regulator.

13. The system of claim 1, wherein the pump comprises a positive displacement pump.

14. The system of claim 13, wherein the pump is at least partially powered by an automotive engine.

15. The system of claim 1, wherein the eductor hopper is suitably configured to introduce a polymer flocculent material into the post-filtered water for subsequent return to a body of water.

16. The system of claim 1, wherein the system is a substantially unitary mobile unit.

17. The system of claim 1, further comprising a pH neutralizer, wherein the pH neutralizer comprises an acid selected from the group consisting of hydrochloric acid, carbonic acid, and sulfuric acid.

18. The system of claim 17, further comprising at least one of a carbon dioxide tank and a carbon dioxide regulator for in situ delivery of carbonic acid to the post-filtered water.

19. A system according to claim 1 wherein the system is configured as a mobile unit.

20. A system according to claim 19 comprising a platform for mounting the hopper, filter, and pump, for mobile deployment to a worksite.

21. A system according to claim 1 wherein the filter comprises a plurality of plates that are configured to move along a rail so as to enable separation of the plates to remove accumulated precipitated material.

22. A filter system for removing precipitated mineral hardness from water, the filter system comprising:
  piping to communicate water containing mineral hardness, communicate water bearing precipitate mineral hardness, and communicate post-filtered water;
  an eductor hopper to add a mineral hardness solubility constant modifier to a flow of the water containing mineral hardness as it flows through the piping, the mineral hardness solubility constant modifier being selected to at least partially precipitate insoluble mineral hardness material from the water containing mineral hardness, thereby producing the water bearing precipitate mineral hardness;
  a filter connected to the eductor hopper by the piping to produce the post-filtered water by at least partially removing the precipitate material from the water bearing precipitate mineral hardness, the filter comprising a plurality of plates capable of moving along a rail to enable separation of the plates to remove accumulated precipitated material; and
  a pump connected to the piping to provide pressure sufficient to communicate the water containing mineral hardness through the piping to the eductor hopper.

23. The system of claim 22, wherein the mineral hardness solubility constant modifier comprises at least one of a base, lime, sodium carbonate, and a polymer.

24. The system of claim 22, wherein the mineral hardness solubility constant modifier suitably increases the pH of the water containing mineral hardness to above about 9.6.

25. The system of claim 22, wherein the filter is further configured to at least partially remove at least one other insoluble particulate material selected from the group consisting of proteins, lipids, organic material, and inorganic material.

26. The system of claim 22, further comprising a pH neutralizer that is suitably adapted to be added after addition of the mineral hardness solubility constant modifier; and wherein the pH neutralizer comprises an acid selected from the group consisting of: hydrochloric acid, carbonic acid and sulfuric acid.

27. The system of claim 22, wherein the mobile unit further comprises at least one of a carbon dioxide tank and a carbon dioxide regulator for in situ delivery of carbonic acid to the post-filtered water.

28. The system of claim 22, further comprising at least one of a dispersal manifold and a circulation pump to at least partially assist in circulating the water bearing precipitate mineral hardness.

29. The system of claim 28, wherein the circulation pump comprises a circulation intake and a circulation output that are configured to communicate the water bearing precipitate mineral hardness from a first location to a second location, wherein the second location is disposed substantially above the first location.

30. The system of claim 28, wherein the dispersal manifold is at least partially integrated into the circulation pump.

31. The system of claim 22, further comprising a baffle to assist with at least one of delivery and dispersal of the solubility constant modifier.

32. The system of claim 22, further comprising a submersible suction device to assist with removal of precipitate material.

33. The system of claim 22, further comprising at least one of: a valve, a pipe, a gauge, a pressure gauge, a pH meter, a hardness test kit, and a regulator.

34. The system of claim 22, wherein the pump is a positive displacement pump at least partially powered by an automotive engine.

35. A system according to claim 22 comprising a platform for mounting the eductor, filter, and pump, for mobile deployment to a worksite.

36. A filtration system for removing mineral hardness from water, the system comprising:
  an intake to draw water, the water having insoluble mineral hardness material;

an eductor connected to the intake, the eductor comprising:
- (i) a pressure connection to provide a pressure differential in the water that increases the velocity of the water;
- (ii) a discharge connection to discharge the water; and
- (iii) a hopper positioned between the pressure connection and the discharge connection to allow introduction of a mineral hardness solubility constant modifier to the water as it flows between the pressure connection and discharge connection, the mineral hardness solubility constant modifier capable of at least partially precipitating the insoluble mineral hardness material in the water to form precipitated material;

a filter to receive water comprising the precipitated material and at least partially remove the precipitated material from the water to form post-filtered water, the filter comprising a plurality of plates along a rail to enable separation of the plates to remove accumulated precipitated material; and an output connected to the filter to expel water substantially free of the precipitated material.

37. A system according to claim 36 comprising one or more valves to control the flow of water from the intake to pass to either the eductor or the filter.

38. A system according to claim 36 comprising a plurality of valves, wherein the valves control the flow of water to flow first to the eductor, and thereafter, to the filter.

39. A system according to claim 36 comprising a pump to pump water (i) from the intake, (ii) through at least one of the eductor and filter, and (iii) out of the output.

40. A system according to claim 39 wherein the water having insoluble mineral hardness is from a body of water, and wherein the pump connects the intake to the body of water.

41. A system according to claim 39 wherein the pump comprises a double diaphragm positive displacement pump.

42. A system according to claim 39 wherein the pump is powered by an automotive engine.

43. A system according to claim 39 wherein the pump comprises a rotary screw air compressor.

44. A system according to claim 39 comprising a pulse dampener connected to the pump.

45. A system according to claim 39 comprising a pH neutralizer to add to the post-filtered water.

46. A system according to claim 36 wherein the output is configured to transfer pH neutralizer to the post-filtered water.

47. A system according to claim 36 wherein the system is configured as a mobile unit.

48. A system according to claim 47 comprising a platform for mounting the eductor and filter, for mobile deployment to a worksite.

* * * * *